Nov. 1, 1927.                                                1,647,186
M. T. MILES ET AL
PIE PAN
Filed Aug. 31, 1926
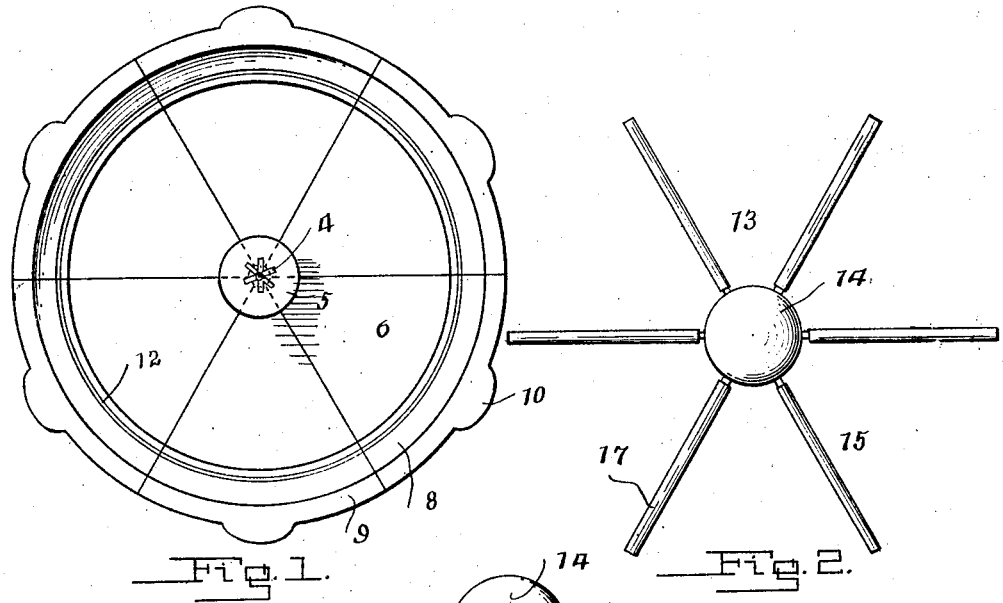
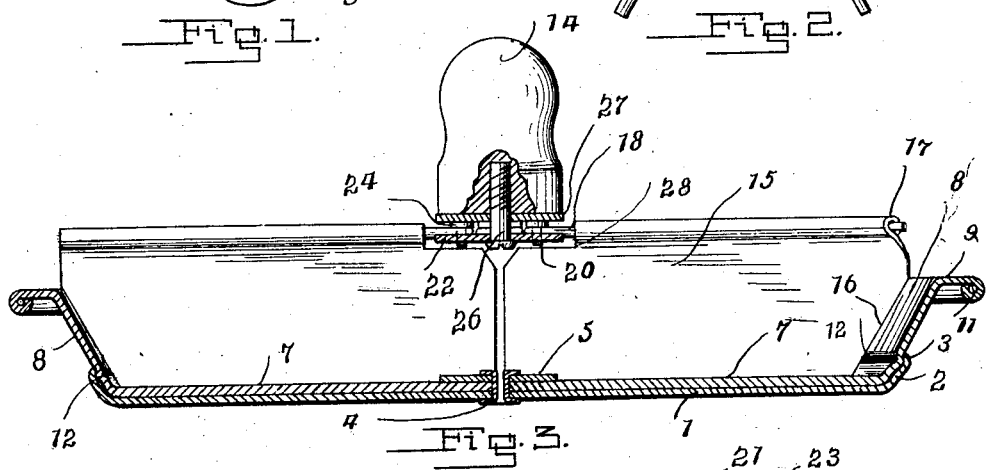
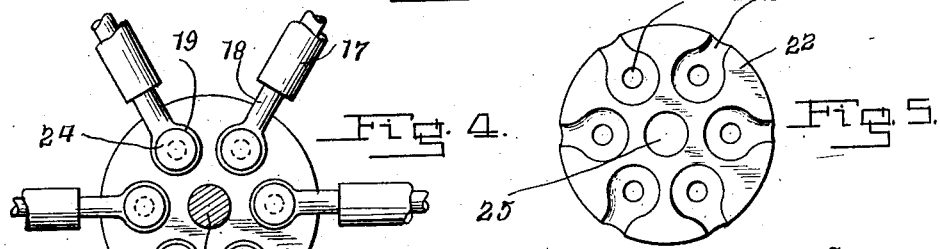
Inventor
M.T. Miles
G.B. Miles
By
Lacey & Lacey, Attorneys Patented Nov. 1, 1927.

1,647,186

UNITED STATES PATENT OFFICE.

MILO T. MILES AND GRACE B. MILES, OF SAN LEANDRO, CALIFORNIA.

PIE PAN.

Application filed August 31, 1926. Serial No. 132,790.

This invention relates to pie pans and similar cooking utensils and has for its object the provision of a pan of such construction that a pie cooked therein may be divided while in the pan and the sections removed therefrom sparately without being directly handled. The invention also has for its object the provision of a pan comprising a holding member and sections removably held in the said holding member and each adapted to support a slice of the pie and facilitate removal of the same without disturbing any other sections of the pie, and a further object of the invention is to provide a cutter of novel construction which may be easily manipulated to divide an entire pie into equal sections. Other objects of the invention will appear incidentally in the course of the following description, and the invention resides in certain novel features which will be particularly pointed out in the appended claims.

In the drawing:

Figure 1 is a plan view of the pie pan;

Fig. 2 is a plan view of the cutter which forms a part of the complete equipment;

Fig. 3 is an enlarged diametrical section showing the cutter within the pan;

Fig. 4 is a sectional plan view of the hub portion of the cutter;

Fig. 5 is a detail plan view of the lower washer forming a part of the cutter.

The holding or base member of the pan comprises a disk 1 of tin or other material suitable for the purpose and having its edge turned upwardly to provide a flange or rim 2 which is turned inwardly to form an annular lip 3. An opening is formed through the holding member 1 at the center thereof to receive a tubular rivet or similar fastening device shown at 4, and this rivet or other fastening device has its upper end upset over a washer or small retaining disk 5. Said retainer is in spaced relation to the holding member 1 so that the inner ends or corners of the sections of the inner pan may be engaged thereunder. The inner pan consists of a plurality of equal sectors 6 of suitable material having flat bottom members 7 adapted to rest directly upon the holding member or base 1 and having their side edges disposed upon radii of the said base member, as will be understood upon reference to Fig. 1. The outer portions of these sectors are turned upwardly and somewhat flared to form a rim 8 which fits within the rim 2 of the base member and may be of any desired height, these rim sections 8 performing the same function as the rim of an ordinary pie pan. At the upper edges of the rim sections 8 is an outstanding flange 9 having its edge formed into extensions or lips 10 centrally, which extension or lip may be rolled to provide a bead 11. Near the bottom 7 of each sector, a rib or teat 12 is formed upon the exterior of the rim 8, and this teat or rib may be sprung under the retaining lip 3 so that the sector will be locked within the holding or base member of the pan.

When the parts are assembled, the inner points or corners of the several sectors 6 will be engaged under the washer or retainer 5 and the projections 12 will be engaged under the retaining lips 3 so that the sectors will be held in close abutting relation within the base member, and pie crust placed in the receptacle defined by the several sectors will be given a continuous uninterrupted support. The pie is made and baked in the usual manner but will be more completely cooked in a given period of time than is possible with the ordinary pie pan inasmuch as the tubular fastening 4 will permit heat to flow to the lower crust and find its way to the sides of the pan under said crust to act more directly thereon than has heretofore been possible so that the lower crust of the pie will attain the same flakiness and tastefulness which is now confined to the upper crust as pie-baking is ordinarily practiced.

Our apparatus includes a cutter 13, by the use of which the pie may be cut into slices of equal size before being removed from the pan, and this cutter comprises a central handle 14 and radial knives or blades 15. The knives are provided in such number and in such angular relation that they may be placed over the pie in alinement with the joints between the several sectors 6 and then by being pushed downwardly through the pie will divide the same into slices, each of which will be supported by one of the sectors. The several blades 15 have vertical inner end edges which may be brought close together at the center of the pan and their outer edges are inclined, as shown at 16, so that they may fit directly against the rim 8. The lower edge of the blade is, of course, the cutting edge and the upper edge portion is rolled to form a tubular bead 17 which receives a light rod 18 supported by the handle member and extending radially therefrom. The inner end of each rod 18 is formed into an eye 19 which is adapted to fit around a pin or stud 20, said pin or stud being engaged through an opening 21 provided therefor in a lower washer or clamping plate 22. In the upper surface of this lower clamping plate, I provide recesses 23 which have circular portions formed about the openings 21 and radial portions leading outwardly from said circular portions through the edge of the plate, as clearly shown in Fig. 5. The eyes 19 will fit within the circular portions of these recesses and the adjacent portions of the rods will fit within the radial portions of the same so that lateral movement of the rods relative to the washer or clamping plate will be prevented. The pins or studs 21 are constructed with heads 24 of greater diameter than the pins 21 so that, when the parts are assembled, the heads will extend over and rest upon the eyes 19. The clamping plate or washer is provided with a central opening 25 through which a retaining screw or threaded pin 26 is inserted upwardly, an upper washer or clamping plate 27 being fitted about the screw to extend over and rest upon the heads 24 of the pins or studs 20, as clearly shown in Fig. 3. Bearing upon the washer or clamping plate 27 and engaged with the screw 26 is the handle portion 14 which is suitably shaped to fit comfortably within and be easily grasped by the hand of the user, the rotating engagement of the said handle with the screw causing the handle to ride downwardly on the screw and cause the upper clamping plate 27 to bear upon the pins or studs 20 so that the rods 18 of the cutter will be firmly secured by and between the two clamping plates, and it is to be noted that the inner upper corners of the several plates 15 are provided with notches or recesses 28 whereby to accommodate the several securing elements.

It is general practice to divide a pie into six pieces and ordinarily, therefore, six sectors 6 will be provided and the cutter will have six blades corresponding to the sectors, but, of course, the number of sectors and blades is immaterial, except that they should be the same. If it be desired to divide a pie into three equal parts, this may be done by merely removing the alternate cutting blades and if it be desired to divide the pie into halves, all the knives except any two which are in alinement may be removed. The removal of the cutting plates does not necessitate disassembling of the handle and clamping elements inasmuch as the blades to be removed may be merely slipped endwise from the supporting rods 18 on which they are mounted, the tubular beads 17 permitting such removal, although fitting upon the rods sufficiently close to prevent accidental dislodgment during handling of the cutter.

By the use of our apparatus, the pie may be divided easily into equal sections and any one section may be removed without disturbing the other sections and handling of the pie will always be in a sanitary manner. To remove a pie section, the lip 10 on the sector which supports the section to be removed is grasped and the rim portion of said sector is disengaged from the base member of the utensil by springing the said rim member slightly inwardly so that the projection 12 will clear the retaining lip 13, whereupon the sector 6 may be withdrawn. By the use of our apparatus, fruit juices will be retained in the pie notwithstanding that the pie may have been cut and breakage of a portion of the pie while being served is avoided. The utensil is exceedingly simple in construction and is efficient in use while the cost of manufacture is very low. The several parts of the utensil may be easily cleaned so that unsanitary conditions are eliminated and the baking of the pie will be expedited and scorching avoided because a double thickness of metal will be provided under the pie to prevent direct contact with the source of heat while at the same time heat is admitted directly to the bottom of the pie.

Having thus described the invention, we claim:

1. A utensil of the type described comprising a base member, sectors to rest upon the base member and cover the surface thereof, a tubular fastener extending vertically through the center of the base member, and a retainer carried by the upper end portion of said fastener and extending over the inner portions of the several sectors.

2. A utensil of the type described comprising a base member having a low peripheral flange provided with an inwardly directed retaining lip at its upper edge, a plurality of sectors arranged to rest upon the base member and cover the entire area thereof and each having a rim portion provided with a projection to engage under the said retaining lip, and means at the center of the base member to engage over the inner ends of the sectors.

3. A utensil of the type described comprising a base member having a rim portion, sectors resting on and covering the base member and having rims releasably engaging the rim of the base member, and means carried by the base member to engage over the inner ends of the sectors.

In testimony whereof we affix our signatures.

MILO T. MILES. [L. S.]
GRACE B. MILES. [L. S.]